US010414911B2

(12) United States Patent
Cernohous et al.

(10) Patent No.: US 10,414,911 B2
(45) Date of Patent: Sep. 17, 2019

(54) HIGHLY FILLED POLYMERIC CONCENTRATES

(71) Applicant: Interfacial Consultants LLC, Prescott, WI (US)

(72) Inventors: Jeffrey Jacob Cernohous, Hudson, WI (US); Dean Elliott, Albany, OR (US); Philip Brunner, Hudson, WI (US)

(73) Assignee: Interfacial Consultants LLC, Prescott, WI (US)

( * ) Notice: Subject to any disclaimer, the term of this patent is extended or adjusted under 35 U.S.C. 154(b) by 0 days.

(21) Appl. No.: 15/571,454

(22) PCT Filed: Feb. 24, 2017

(86) PCT No.: PCT/US2017/019420
§ 371 (c)(1),
(2) Date: Nov. 2, 2017

(87) PCT Pub. No.: WO2017/147465
PCT Pub. Date: Aug. 31, 2017

(65) Prior Publication Data
US 2018/0327577 A1 Nov. 15, 2018

Related U.S. Application Data

(60) Provisional application No. 62/299,858, filed on Feb. 25, 2016, provisional application No. 62/346,154, filed on Jun. 6, 2016.

(51) Int. Cl.
C08L 23/06 (2006.01)
C08L 67/02 (2006.01)
C08L 75/04 (2006.01)
C08J 3/20 (2006.01)
C08J 3/22 (2006.01)

(52) U.S. Cl.
CPC ............ *C08L 23/06* (2013.01); *C08J 3/201* (2013.01); *C08J 3/226* (2013.01); *C08L 67/02* (2013.01); *C08L 75/04* (2013.01); *C08J 2323/06* (2013.01); *C08J 2367/02* (2013.01); *C08J 2377/06* (2013.01); *C08J 2423/06* (2013.01); *C08J 2423/12* (2013.01); *C08L 2205/025* (2013.01); *C08L 2207/062* (2013.01); *C08L 2310/00* (2013.01)

(58) Field of Classification Search
CPC . C08J 3/226; C08J 3/201; C08L 23/06; C08L 67/02; C08L 75/04; C08L 2310/00; C08L 2205/025; C08L 2207/062
See application file for complete search history.

(56) References Cited

U.S. PATENT DOCUMENTS

| | | | |
|---|---|---|---|
| 4,582,756 A | 4/1986 | Niinuma et al. | |
| 2007/0155859 A1 | 7/2007 | Song et al. | |
| 2009/0020914 A1* | 1/2009 | Nelson | C08L 23/06 264/294 |
| 2012/0088072 A1 | 4/2012 | Pawloski et al. | |
| 2012/0208933 A1 | 8/2012 | Hamilton et al. | |
| 2012/0237606 A1 | 9/2012 | Wellings | |
| 2014/0005307 A1 | 1/2014 | Cernohous et al. | |
| 2015/0315377 A1* | 11/2015 | Mehta | C08K 3/013 524/525 |
| 2016/0083619 A1 | 3/2016 | Anderson et al. | |

FOREIGN PATENT DOCUMENTS

| | | |
|---|---|---|
| JP | 2007/031706 A | 2/2007 |
| JP | 2013/234255 A | 11/2013 |
| WO | WO 2006/123993 A2 | 11/2006 |

OTHER PUBLICATIONS

International Search Report and Written Opinion for Application No. PCT/US2017/019420, filed Feb. 24, 2017, dated Jun. 2, 2017 (12 pgs).
Liu et al., "Synergistic flame retardant effects between hollow glass microspheres and magnesium hydroxide in ethylene-vinyl acetate composites," *Polymer Degradation and Stability*, vol. 104, Apr. 1, 2014, pp. 87-94.
International Search Report and Written Opinion for PCT/US2017/057381, dated Jan. 17, 2018 (16 pages).
International Preliminary Report on Patentability for Application No. PCT/US2017/019420, dated Sep. 7, 2018 (9 pgs).

* cited by examiner

*Primary Examiner* — Robert D. Harlan
(74) *Attorney, Agent, or Firm* — Patterson Thuente Pedersen, P.A.

(57) ABSTRACT

A composition comprises a highly filled polymeric concentrate produced by melt processing a filler with a liquid polymeric dispersion.

20 Claims, 2 Drawing Sheets

HIGHLY FILLED POLYMERIC CONCENTRATES

CROSS-REFERENCE TO RELATED APPLICATIONS

The present application is a National Phase entry of PCT Application No. PCT/US2017/019420, filed Feb. 24, 2017, which claims the benefit of U.S. Provisional Application No. 62/299,858, filed Feb. 25, 2016, and U.S. Provisional Application No. 62/346,154, filed Jun. 6, 2016, each of which are fully incorporated herein by reference.

TECHNICAL FIELD

This disclosure relates to compositions and methods for producing highly filled polymeric concentrates.

BACKGROUND

There is a need in the market for highly filled polymeric concentrates or masterbatches. Today, depending on the type and attributes (e.g., specific gravity, surface area) of the filler, it is difficult to produce polymeric concentrates at levels greater than about 80 weight % or 50 volume % filler using conventional melt processing techniques. Around and above these loading levels the viscosity of the polymeric concentrate becomes too high and can ultimately torque out (viz., stall) the processing equipment. It is also difficult to maintain consistency in the final product when feeding fillers at such loading levels, especially in low bulk density materials. Lastly, the break up and dispersion of additives in the polymeric concentrates becomes more pronounced as the loading level of fillers increases, which can lead to poor performance in the end product.

SUMMARY

We have discovered that, by utilizing liquid polymeric dispersions, we can produce polymeric concentrates at levels greater than 80 wt % or 50 volume % using melt processing techniques. In one non-limiting embodiment, for example, a polymeric concentrate can be made using high speed mixing of an additive with a waterborne polymeric dispersion followed by pelletization using a California pellet mill and/or twin-screw extrusion. The polymeric concentrates described in this disclosure provide significant value to plastics compounders and converters. These polymeric concentrates are easier to handle, more cost effective and more easily dispersed than competitive materials currently on the market.

In one embodiment, a filler is melt processed with a liquid polymeric dispersion, which includes, e.g., a polymer dispersed or dissolved in a liquid carrier. In another embodiment, the liquid dispersion is a waterborne polymeric dispersion. In a preferred embodiment, the waterborne polymeric dispersion is a waterborne polyolefin dispersion. In one embodiment, filler level in the final polymeric concentrate after melt processing is greater than 80 wt % or 50 volume %. In preferred embodiments, the filler level in the final concentrate is greater than 90 wt % or 60 volume %. The polymeric concentrates of this disclosure can be converted into articles using melt processing techniques, such as compounding, extrusion, and molding. Such articles have utility in a variety of markets including automotive, building and construction, consumer and appliance markets.

Using a liquid polymeric dispersion provides a number of advantages. For example, using a liquid polymeric dispersion can lower the overall viscosity of the highly filled polymeric concentrate making it easier to melt process. The liquid polymeric dispersion also effectively and efficiently coats the filler, such that upon removal of the liquid carrier, the polymer remains uniformly coated onto the additive surface. Due to the uniformity of the polymer coating, upon let-down, the polymer begins to flow and causes the additive to disperse, leading to enhanced physical properties in the end product. Finally, the liquid carrier can densify the additive making it possible to achieve higher loadings in the final polymer concentrate.

Using the disclosed liquid polymeric dispersion provides an unexpected way of making highly filled polymeric concentrates. Typically, the presence of liquids (e.g., moisture or solvent) can cause severe issues for melt-extrusion, such as hydrolysis of the polymer or degradation of fillers. Furthermore, because the liquid polymeric dispersion can have a high liquid content greater than 50 wt %, it normally would be difficult to control and efficiently melt process the dispersion. With appropriate processing, however, liquid dispersion can be used to prepare low-cost, highly filled, and well-dispersed polymeric concentrates.

The above summary is not intended to describe each illustrated embodiment or every implementation of the subject matter hereof. The detailed description that follows more particularly exemplifies various illustrative embodiments.

DETAILED DESCRIPTION

Figure 1:
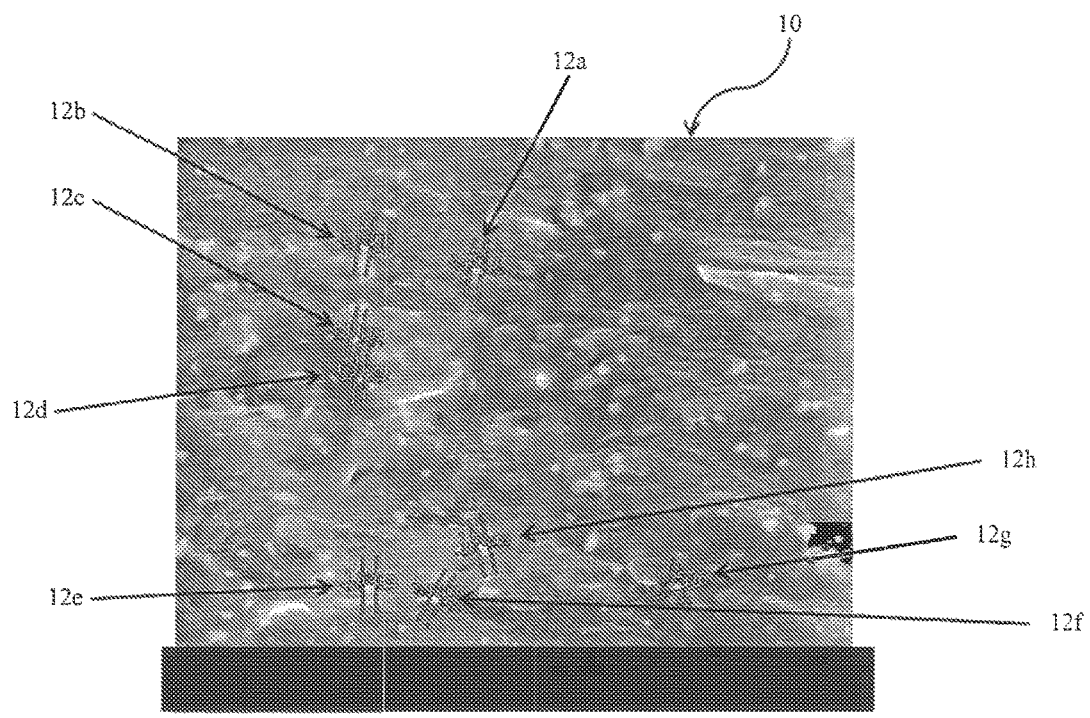
FIG. 1 is a scanning electron microscope image at 2000× depicting measurements of calcium carbonate compounds in a polymeric matrix.

Unless the context indicates otherwise the following terms shall have the following meaning and shall be applicable to the singular and plural:

The terms "a," "an," "the," "at least one," and "one or more" are used interchangeably. Thus, for example, a liquid polymeric dispersion containing "a" polymer means that the liquid polymeric dispersion may include "one or more" polymers.

The term "coupling agent" means an additive that improves the interfacial adhesion between a polymeric matrix and a cellulosic filler.

The term "dispersion" means a material comprising more than one phase where at least one of the phases consists of finely divided phase domains (e.g., solid particles) distributed throughout a continuous phase domain (e.g., a liquid or melt-processed solid).

The term "filler" means a solid, liquid, or gas material added to a polymer during melt processing.

The term "highly filled" means a final polymer concentrate which after melt processing contains greater than 80 wt % or 50 volume % of filler.

The term "liquid polymeric dispersion" means a substance that flows freely and comprises a polymer dispersed or dissolved in a liquid carrier.

The term "melt processable composition" means a formulation that is processed, typically at elevated temperatures near or exceeding the melting point or softening point of at least one component of the formulation, by means of a polymer melt processing technique.

The term "melt processing technique" means a technique for applying thermal and mechanical energy to melt process a polymer or composition, such as compounding, extrusion, injection molding, blow molding, rotomolding, or batch mixing. For purposes of this disclosure, melt processing is differentiated from thermal compression bonding applications.

The terms "polymer" and "polymeric" mean a molecule of high relative molecular mass, the structure of which essentially contains multiple repetitions of units derived, actually or conceptually, from molecules of low relative molecular mass.

The term "polymeric concentrate" means a mixture of a polymeric material and a filler that when melt processed can be formed into a non-friable pellet or agglomerate.

The term "polymeric matrix" means a melt processable, thermoplastic polymeric material or materials.

The terms "preferred" and "preferably" refer to embodiments that may afford certain benefits, under certain circumstances. Other embodiments, however, may also be preferred, under the same or other circumstances. Furthermore, the recitation of one or more preferred embodiments does not imply that other embodiments are not useful, and is not intended to exclude other embodiments from the claimed scope.

The recitation of numerical ranges using endpoints includes all numbers subsumed within that range (e.g. 1 to 5 includes 1, 1.5, 3, 3.95, 4.2, 5, etc.).

This disclosure describes highly filled polymeric concentrates that are easier to handle, more cost effective, and more easily dispersed than competitive materials known in the art. In one embodiment, a filler is melt processed with a liquid polymeric dispersion to make a polymeric concentrate. In another embodiment, the filler level after melt processing in the resulting polymeric concentrate is greater than 80 wt % or greater than 50 volume %. Additional embodiments may have levels in the final concentrate greater than 90 wt % or 60 volume %. The disclosed polymeric concentrates can be converted into articles using compounding, extrusion and molding techniques. These articles have utility in a variety of markets including automotive, building and construction, consumer and appliance markets.

A liquid polymeric dispersion may include one or more polymers that can be delivered in liquid dispersion form. The liquid polymeric dispersion may, for example, contain a solids content of at least about 5 wt %, at least about 10 wt %, at least about 20 wt %, at least about 30 wt %, at least about 40 wt %, at least about 50 wt %, or at least about 70 wt %. In one embodiment, the liquid polymeric dispersion comprises about 30-40 wt % solids. In another embodiment, the liquid polymeric dispersion comprises about 40-50 wt % solids. In another embodiment, the liquid polymeric dispersion comprises about 50 wt % solids.

In one embodiment, the liquid dispersion is a waterborne polymeric dispersion. In another embodiment, the waterborne polymeric dispersion is a waterborne polyolefin dispersion. In one embodiment, the polymer is dispersed in a liquid solvent or oil. Non-limiting examples of liquid solvents or oils include: any organic solvents, mineral or other hydrocarbon based oils, and silicone based oils. In another embodiment, the liquid polymeric dispersion is water-based. In another embodiment, the liquid polymeric dispersion contains a water-in-oil emulsion or an oil-in-water emulsion. In another embodiment, the liquid polymeric dispersion can be made by polymerizing a polymeric precursor (e.g., a salt of hexane-1,6-diamine and adipic acid) in a liquid carrier.

A wide variety of polymers may be provided in a liquid polymeric dispersion. Non-limiting examples of polymers include high density polyethylene (HDPE), low density polyethylene (LDPE), linear low density polyethylene (LLDPE), functional polyolefin copolymers including polyolefin based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), or combinations thereof. In some embodiments, polyolefins are well suited to serve as polymeric matrices for the liquid polymeric dispersion. Non-limiting examples of useful liquid polymeric dispersions include the polyolefin dispersions sold under the HYPOD™ trademark by Dow Chemical or those sold under the Michem™ or Hydrosize™ trademark by Michelman; the waterborne sulfopolyester dispersions sold under the Eastman AQ™ trademark by Eastman Chemical; or a salt of hexane-1,6-diamine and adipic acid (AH Salt), diluted with water to form a waterborne polymeric dispersion, sold by Ascend Performance.

A liquid polymeric dispersion can be melt processed with one or more polymers. Non-limiting examples of such polymers include high density polyethylene (HDPE), low density polyethylene (LDPE), linear low density polyethylene (LLDPE), functional polyolefin copolymers including polyolefin based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), or combinations thereof.

A liquid polymeric dispersion can be melt processed with one or more fillers. Fillers are useful in that they allow one skilled in the art to adjust physical and thermal properties of the end use article made using a polymeric material. For example, fillers can improve physical and thermal properties of end use articles. Some fillers can also be utilized to reduce the coefficient of thermal expansion (CTE) of a polymeric article. Non-limiting examples of fillers include mineral and organic fillers including carbonates, silicates, talc, mica, wollastonite, clay, silica, alumina, carbon fiber, carbon black, carbon nanotubes, graphite, graphene, volcanic ash, expanded volcanic ash, perlite, glass fiber, solid glass microspheres, hollow glass microspheres, cenospheres, ceramics, and conventional cellulosic materials including: wood flour, wood fibers, sawdust, wood shavings, newsprint, paper, flax, hemp, wheat straw, rice hulls, kenaf, jute, sisal, peanut shells, soy hulls, or any cellulose containing material. The amount of filler in the polymeric concentrate after melt processing is greater than 80 wt % or 50 volume %. In some embodiments, the amount of filler by volume may exceed 70% or even 80%.

In another embodiment, a liquid polymeric dispersion is melt processed with a lightweight filler to form a lightweight highly filled polymeric concentrate. Non-limiting examples of lightweight fillers include: hollow glass microspheres, cenospheres, perlite and expanded volcanic ash. Preferred lightweight fillers include hollow glass microspheres and expanded volcanic ash. In another embodiment, a more dense filler is combined with the lightweight filler and the liquid polymeric dispersion to form a lightweight highly filled polymeric concentrate. In another embodiment, a liquid polymeric dispersion is melt processed with a powdered polymer to form a highly filled polymeric system. A non-limiting example of a preferred powdered polymer includes, but is not limited to, polytetrafluoroethylene (PTFE).

In another embodiment, the polymeric matrix may contain other additives. Non-limiting examples of such other additives include antioxidants, light stabilizers, blowing agents, foaming additives, antiblocking agents, heat stabilizers, impact modifiers, biocides, antimicrobial additives, compatibilizers, plasticizers, tackifiers, processing aids, lubricants, coupling agents, flame retardants, oxygen scavengers, and colorants. The additives may be incorporated into the melt processable composition in the form of powders, pellets, granules, or in any other form that can survive extrusion. The amount and type of conventional additives in the melt processable composition may vary depending upon the polymeric matrix and the desired physical properties of the finished composition. Based on this disclosure, those skilled in the art of melt processing will be capable of selecting appropriate amounts and types of additives to match with a specific polymeric matrix in order to achieve desired physical properties of the finished material.

Additives well suited for melt processing with the polymeric dispersion of this disclosure include coupling agents. Coupling agents can assist in the interfacial adhesion or other attraction between a filler or other additive and the polymeric matrix. Non-limiting examples of coupling agents include silanes, zirconates, titanates and functionalized polymers. Preferred coupling agents included silane and maleic anhydride grafted polymers. Non-limiting examples of maleic anhydride grafted polymers include those sold under the trademarks Polybond™ (Addivant), Extinity™ (NWP), Integrate™ (Lyondell Basell), and Fusabond™ (DuPont). Typical loading levels of coupling agents and antioxidants are approximately 0.1 to 5 wt % of the final polymeric concentrate formulation.

The highly filled polymeric concentrate composition and optional additives can be prepared by blending the filler and the optional additives into a liquid polymeric dispersion. Depending on the type and nature of polymeric matrix, this can be done using a variety of mixing processes that will be familiar to those skilled in the art. The liquid polymeric dispersion and filler can be combined together by any suitable equipment available in the plastics industry, such as with a compounding mill, a Banbury mixer, or a mixing extruder. In one embodiment, a vented twin screw extruder is utilized. The materials may be injected or supplied to the extruder at various insertion points such as the throat or at downstream ports in the extruder. The materials may be used in the form, for example, of a powder, a pellet, or a granular product. The mixing operation is most conveniently carried out at a temperature above the melting point or softening point of the polymer.

In another embodiment, the highly filled polymeric concentrate composition and optional additives can be prepared by blending the filler and optional additives into a liquid polymeric dispersion and processing directly in a pellet mill or densifier to form the highly filled polymeric concentrate.

The minimum temperature during melt processing is typically above the temperature required to volatilize the liquid carrier in the dispersion. For example, if the liquid carrier is water, the temperature should be greater than 100° C. during melt processing. The volatilized liquid carrier can be vented or pulled away (e.g., using a vacuum) from the melt processing unit. The resulting melt processed filled concentrate can be either pelletized directly into a pellet, agglomerate or granulate form or fed from the melt processing equipment into a secondary operation to pelletize the composition (e.g., a pellet mill or densifier) into a densified pellet, agglomerate or granulate. The densified pellet, agglomerate or granulate of this disclosure preferably has enough integrity such that it can be readily used in a subsequent compounding, extrusion or molding step (viz., without breaking up into a fine particulate during transport, conveying or feeding).

Melt-processing of the liquid polymeric dispersion and filler are typically performed at a temperature from 800 to 300° C., although other optimum operating temperatures are selected depending upon the carrier boiling point(s) and the melting point, melt viscosity, and thermal stability of the polymer(s). A variety of melt processing devices, e.g., extruders, may be used to process the melt processable compositions of this disclosure.

The highly filled polymeric concentrates of this disclosure have broad utility in the automotive, building and construction, consumer and appliance. Non-limiting examples of potential uses for such concentrates include automotive components, decking, fencing, railing, roofing, siding, containers and appliance housings.

The polymeric concentrates described herein provide significant value to plastics compounders and converters. These polymeric concentrates are easier to handle, more cost effective and more easily dispersed than competitive materials currently on the market.

In the following examples, all parts and percentages are by weight unless otherwise indicated.

EXAMPLES

TABLE 1

| MATERIALS | |
|---|---|
| Material | Supplier |
| LPD | Liquid Polymeric Dispersion, HYPOD 1001, waterborne PE copolymer, 40-44 wt % solids, commercially available from Dow Chemical (Midland, MI) |
| LPD 2 | Liquid Polymeric Dispersion, AQ 55S, waterborne sulfopolyester, 30-33 wt % solids, commercially available from Eastman Chemical (Kingsport, TN) |
| LPD 3 | Liquid Polymeric Dispersion, a salt of hexane-1, 6-diamine and adipic acid (AH Salt), diluted with water to form a waterborne dispersion at 50 wt % solids, commercially available from Ascend Performance Materials (Houston, TX) |
| PP | Bapolene 4012F, 12 MFI polypropylene flake resin, commercially available from Bamberger Polymers (Jericho, NY) |
| HDPE | Ineos T50-440-119 HDPE, commercially available from Bamberger Polymers Inc., (Jericho, NY) |
| PET | PET, commercially available from Valley Industrial |
| Nylon | N66 UF NC PEL Nylon 6, 6 commercially available from Jeda Compounding and Distribution Services |

TABLE 1-continued

MATERIALS

| Material | Supplier |
|---|---|
| Talc 1 | Silverline 303 talc, commercially available from Imerys, Inc, (San Jose, CA) |
| Talc 2 | HAR Talc, commercially available from Imerys, Inc, San Jose, CA |
| CaCO$_3$ | GLC 1012 calcium carbonate, commercially available from Great Lakes Calcium Inc., (Green Bay, WI) |
| Clay | Closite 15A clay, commercially available from BYK Inc., (Wesel, Germany) |
| Wood | 40 mesh Maple, commercially available from American Wood Fibers, (Schoefield, WI) |
| MS | S60HS, hollow glass microspheres, commercially available from 3M (St. Paul, MN) |

TABLE 2

EXPERIMENTAL MASTERBATCH (MB) CONCENTRATE FORMULATIONS

| Example | LPD | LPD 2 | LDP 3 | PP | Talc 1 | Talc 2 | CaCO$_3$ | Clay | MS | Wood | Weight % Filler | Volume % Filler |
|---|---|---|---|---|---|---|---|---|---|---|---|---|
| MB1 | 10 | — | — | 90 | — | — | — | — | — | — | 95.8 | 89.3 |
| MB2 | 15 | — | — | 85 | — | — | — | — | — | — | 93.5 | 84.0 |
| MB3 | 5 | — | — | — | 95 | — | — | — | — | — | 98.0 | 94.4 |
| MB4 | 10 | — | — | — | 90 | — | — | — | — | — | 95.8 | 89.3 |
| MB5 | 15 | — | — | — | 85 | — | — | — | — | — | 93.5 | 84.0 |
| MB6 | 5 | — | — | — | — | 95 | — | — | — | — | 98.0 | 96.7 |
| MB7 | 10 | — | — | — | — | 90 | — | — | — | — | 95.8 | 93.4 |
| MB8 | 15 | — | — | — | — | 85 | — | — | — | — | 93.5 | 89.1 |
| MB9 | 20 | — | — | — | — | — | — | — | 80 | — | 90.9 | 87.0 |
| MB10 | 15 | — | — | 40 | — | — | — | — | 45 | — | 50 | 83.3 |
| MB11 | 20 | — | — | 60 | — | — | — | — | 20 | — | 90.9 | 87.4 |
| MB12 | — | 20 | — | — | — | — | 80 | — | — | — | 92.2 | 88.8 |
| MB13 | — | — | 20 | — | 80 | — | — | — | — | — | 90.4 | 79.5 |

TABLE 3

EXPERIMENTAL COMPOUND FORMULATIONS AND COMPARATIVE EXAMPLES (CE)

| Example | HDPE | PET | Nylon | MB1 | MB2 | MB3 | MB4 | MB5 | MB6 | MB7 | MB8 | MB12 | MB13 | Talc | CaCO$_3$ | Clay |
|---|---|---|---|---|---|---|---|---|---|---|---|---|---|---|---|---|
| 1 | 68.5 | — | — | 31.5 | — | — | — | — | — | — | — | — | — | — | — | — |
| 2 | 66.25 | — | — | — | 33.75 | — | — | — | — | — | — | — | — | — | — | — |
| 3 | 69.25 | — | — | — | — | 30.75 | — | — | — | — | — | — | — | — | — | — |
| 4 | 68.5 | — | — | — | — | — | 31.5 | — | — | — | — | — | — | — | — | — |
| 5 | 66.25 | — | — | — | — | — | — | 33.75 | — | — | — | — | — | — | — | — |
| 6 | 69.25 | — | — | — | — | — | — | — | 30.75 | — | — | — | — | — | — | — |
| 7 | 68.5 | — | — | — | — | — | — | — | — | 31.5 | — | — | — | — | — | — |
| 8 | 66.25 | — | — | — | — | — | — | — | — | — | 33.75 | — | — | — | — | — |
| 9 | — | 80 | — | — | — | — | — | — | — | — | — | 20 | — | — | — | — |
| 10 | — | — | 80 | — | — | — | — | — | — | — | — | — | 20 | — | — | — |
| CE1 | 70 | — | — | — | — | — | — | — | — | — | — | — | — | 30 | — | — |
| CE2 | 70 | — | — | — | — | — | — | — | — | — | — | — | — | — | 30 | — |
| CE3 | 70 | — | — | — | — | — | — | — | — | — | — | — | — | — | — | 30 |

SAMPLE PREPARATION

For MB1-MB9 and MB13, the filler and liquid polymeric dispersion was blended in a plastic bag and gravimetrically fed into a 27 mm twin screw extruder (52:1 L:D, commercially available from Entek Extruders, Lebanon, Oreg.). The compounding was performed using the following temperature profile in zones 1-13: 100, 350, 400, 400, 400, 400, 400, 400, 400, 400, 400, 400, and 400 degrees Fahrenheit (about 38, 177, 204, 204, 204, 204, 204, 204, 204, 204, 204, 204, and 204 degrees Celsius, respectively). The material was run though the extruder with the die removed and collected as a dry particulate. The dry particulate was run through an electric 5" (approximately 13 cm) pellet mill (commercially available from Pellet Masters, Chippewa Falls, Wis.) to densify the material. The filler masterbatches were subsequently let-down into a thermoplastic matrix. For MB 10-12, the fillers and liquid polymeric dispersion were blended in a plastic bag and directly pelletized in a 5" (approximately 13 cm) electric pellet mill (commercially available from Pellet Masters, Chippewa Falls, Wis.).

For the experimental compound formulations 1-8, the HDPE, MBs, talc, calcium carbonate, and clay were dry blended in a plastic bag and gravimetrically fed into a 27 mm twin screw extruder (52:1 L:D, commercially available from Entek Extruders, Lebanon, Oreg.). Comparative Examples CE1-CE3 demonstrate properties for directly compounded mineral filled HDPE compounds. The compounding for formulations 1-8 and CE1-CE3 was performed using the following temperature profile in zones 1-13: 100, 350, 400, 400, 400, 400, 400, 400, 400, 400, 400, 400, and 400 degrees Fahrenheit (about 38, 177, 204, 204, 204, 204, 204, 204, 204, 204, 204, 204, and 204 degrees Celsius, respectively). The compounds were extruded into strands and pelletized into pellets approximately 1-2 mm in length. The resulting compounds were injection molded into test specimens and characterized based on ASTM D790-07 and ASTM D638-00. ASTM D790-07 provides a standardized method for testing the flexural properties, such as flexural modulus and strength, for unreinforced and reinforced plastics. ASTM D638-00 provides a standardized method for testing the tensile properties of plastics, including tensile modulus, tensile strength and elongation. Specific Gravity was determined using the Archimedes Method. Impact testing was performed based on ASTM D256-10. The results of this testing are shown in Table 4 below.

TABLE 4

EXPERIMENTAL RESULTS

| Example | Flexural Modulus (kpsi) | Flexural Strength (kpsi) | Specific Gravity (g/cm$^3$) | Tensile Modulus (kpsi) | Tensile Strength (kpsi) | Elongation at Break (%) | Izod Impact Unnotched (ft-lbs/in) |
|---|---|---|---|---|---|---|---|
| 1 | 202 | 4.7 | 1.17 | 289 | 3.2 | 4.9 | 4.22 |
| 2 | 197 | 4.7 | 1.17 | 289 | 3.1 | 4.0 | 4.20 |
| 3 | 199 | 4.4 | 1.17 | 238 | 2.8 | 5.6 | 5.73 |
| 4 | 261 | 4.2 | 1.16 | 233 | 2.8 | 5.8 | 6.18 |
| 5 | 259 | 4.3 | 1.17 | 234 | 3.0 | 4.4 | 4.65 |
| 6 | 252 | 4.0 | 1.06 | 297 | 2.4 | 2.0 | 1.22 |
| 7 | 253 | 3.8 | 1.05 | 323 | 2.2 | 1.9 | 1.27 |
| 8 | 236 | 3.7 | 1.06 | 286 | 2.1 | 2.0 | 1.15 |
| CE1 | 194 | 4.2 | 1.16 | 241 | 2.9 | 5.1 | 6.25 |
| CE2 | 250 | 4.6 | 1.17 | 282 | 3.3 | 5.0 | 4.35 |
| CE3 | 264 | 4.4 | 1.06 | 328 | 2.5 | 1.3 | 1.15 |

Experimental compound formulations 1-8 demonstrate the physical properties of the let-down compounds of this disclosure. They compare favorably to the mechanical properties of the materials directly compounded into virgin HPDE at the same filler loading. For example, Example 1 and CE1 have the same filler loading level, but formulation 1 was processed with MB1 whereas CE1 was made by directly feeding in HDPE with talc filler. Formulation 4 and CE2 and Formulation 7 and CE3 have the same filler loading but with calcium carbonate and clay, respectively. These results show that the physical performance for products obtained by letting down the MB formulations is at least as good if not better than that obtained by direct feeding of the filler with virgin resin are roughly the same. This signifies that the additives in the MBs may undergo improved dispersion during the let-down, thereby enhancing the physical properties of the end compound. Ultimately, although the MB formulations have volume percentages greater than 50, one can still disperse the MB formulation upon let-down in a final polymer compound.

Figure 2:
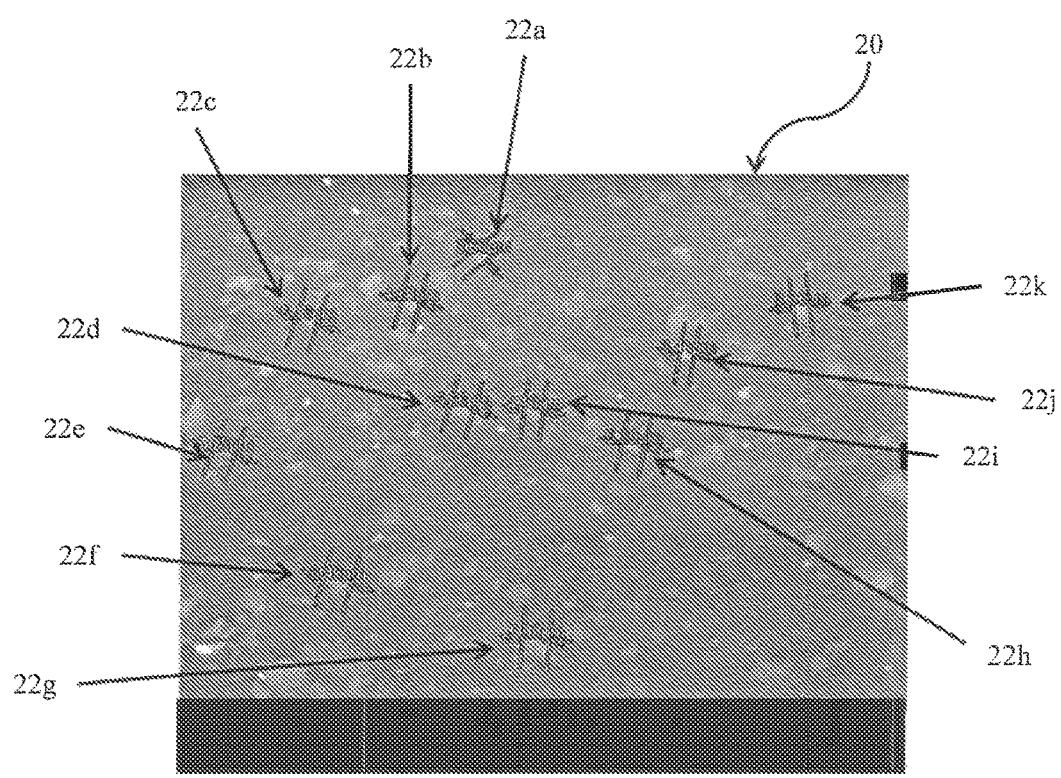
FIG. 2 is a scanning electron microscope image at 1000× depicting measurements of talc compounds in a polymeric matrix.

For experimental compound formulations 9 and 10 containing MB 12 and 13, respectively, scanning electron microscopy (SEM) images were taken to examine dispersion quality and particle size, as shown in FIGS. 1 and 2. FIG. 1 is an SEM image at 2000× of calcium carbonate compound measurements 12a, 12b, 12c, 12d, 12e, 12f, and 12g in 80/20 wt % PET polymeric matrix 10. FIG. 2 is an SEM image at 1000× of talc compound measurements 22a, 22b, 22c, 22d, 22e, 22f, 22g, 22h, 22i, 22j, and 22k in 80/20 wt % nylon 6,6 polymeric matrix 20. As shown in FIGS. 1 and 2, MB 12 and 13 can be successfully let-down in PET and nylon 6, 6, respectively. This is evident because the measured particle size of the additives, carbonate compounds 12 in FIG. 1 and talc compounds 22 in FIG. 2, are similar to the reported size of the respective additives. Furthermore, in both FIGS. 1 and 2, the additives also appear evenly distributed throughout the polymer matrix, demonstrating the efficacy of the liquid polymeric dispersion.

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the disclosure. This application is intended to cover any adaptations or variations of the preferred embodiments discussed herein.

What is claimed is:

1. A composition comprising a highly filled polymeric concentrate produced by melt processing a liquid polymeric dispersion and a filler, wherein the highly filled polymeric concentrate has at least 60% by volume filler.

2. The composition according to claim 1, wherein the highly filled polymeric concentrate has at least 70% by volume filler.

3. The composition according to claim 1, wherein the highly filled polymeric concentrate has at least 80% by volume filler.

4. The composition according to claim 1, wherein the highly filled polymeric concentrate has at least 90% by volume filler.

5. A highly filled polymeric concentrate comprising:
a continuous polymeric phase; and
a filler dispersed throughout the continuous polymeric phase;
wherein the highly filled polymeric concentrate has at least 60% by volume filler.

6. The highly filled polymeric concentrate according to claim 5, wherein the highly filled polymeric concentrate has at least 70% by volume filler.

7. The highly filled polymeric concentrate according to claim 5, wherein the highly filled polymeric concentrate has at least 80% by volume filler.

8. The highly filled polymeric concentrate according to claim 5, wherein the highly filled polymeric concentrate has at least 90% by volume filler.

9. The highly filled polymeric concentrate according to claim 5, wherein the liquid polymeric dispersion includes a polyolefin dispersion.

10. The highly filled polymeric concentrate according to claim 5, wherein the filler includes a lightweight filler.

11. The highly filled polymeric concentrate according to claim 5, further comprising a coupling agent.

12. The highly filled polymeric concentrate according to claim 5, further comprising an additive.

13. A method for making a highly filled polymeric concentrate comprising:
blending a filler and a liquid polymeric dispersion to make a blended liquid polymeric dispersion;
providing a polymer to a melt processing device;
providing the blended liquid polymeric dispersion to the melt processing device; and melt processing the blended liquid polymeric dispersion and the polymer to make a highly filled polymeric concentrate, wherein the highly filled polymeric concentrate has at least 60% by volume filler.

14. The method according to claim 13, wherein the highly filled polymeric concentrate has at least 70% by volume filler.

15. The method according to claim 13, wherein the highly filled polymeric concentrate has at least 80% by volume filler.

16. The method according to claim 13, wherein the highly filled polymeric concentrate has at least 90% by volume filler.

17. The method according to claim 13, wherein the highly filled polymeric concentrate has at least 94% by volume filler.

18. The method according to claim 13, wherein the melt processing device comprises an extruder.

19. The method according to claim 13, further comprising providing a coupling agent to the melt processing device.

20. The method according to claim 13, further comprising providing an additive to the melt processing device.

\* \* \* \* \*